United States Patent [19]

Elliott et al.

[11] Patent Number: 4,795,517
[45] Date of Patent: Jan. 3, 1989

[54] PROCESS FOR SHAPING AND COVERING CUSHION FOAM

[75] Inventors: George M. Elliott, Alpharetta; Michael L. Avery, Cumming, both of Ga.

[73] Assignee: Astechnologies, Inc., Roswell, Ga.

[21] Appl. No.: 870,971

[22] Filed: Jun. 5, 1986

[51] Int. Cl.⁴ .................... B31F 1/00; B68G 7/00; B29C 65/00
[52] U.S. Cl. .................... 156/221; 156/242; 156/290; 29/91.1; 264/249
[58] Field of Search .................... 156/78, 77, 81, 196, 156/206, 219, 220, 221, 222, 242, 245, 272.2, 285, 286, 290, 291, 70, 209, 308.4, 309.6, 313; 264/321, 264, 101, 119, 82; 8/41

[56] References Cited

U.S. PATENT DOCUMENTS

| | | | |
|---|---|---|---|
| 3,242,510 | 3/1966 | Goldstone | 264/321 |
| 3,406,235 | 10/1968 | Trogdon et al. | 264/321 |
| 3,654,019 | 4/1972 | Cusick | 156/285 |
| 3,758,358 | 9/1973 | Kuroda | 156/220 |
| 3,867,240 | 2/1975 | Doerfling | 428/159 |
| 3,891,738 | 6/1975 | Shen | 264/101 |
| 3,935,358 | 1/1976 | Wyeth | 156/285 |
| 4,107,829 | 8/1978 | Urai et al. | 156/196 |
| 4,121,960 | 10/1978 | Focht | 156/219 |
| 4,124,421 | 11/1978 | Fuji | 156/221 |
| 4,199,390 | 4/1980 | Pollard | 156/219 |
| 4,229,240 | 10/1980 | Borgiani | 156/290 |
| 4,260,575 | 4/1981 | Thew et al. | 264/321 |
| 4,264,386 | 4/1981 | Sears, Jr. et al. | 156/245 |
| 4,313,776 | 2/1982 | Urai et al. | 156/220 |
| 4,400,422 | 8/1983 | Smith | 428/156 |
| 4,454,187 | 6/1984 | Flowers et al. | 156/220 |
| 4,692,199 | 9/1987 | Kozlowski | 156/245 |

OTHER PUBLICATIONS

*Thermodynamics*, Black et al., Harper & Row Publishers, pp. 45 to 54.

Primary Examiner—Michael W. Ball
Assistant Examiner—Louis Falasco
Attorney, Agent, or Firm—Sutherland, Asbill & Brennan

[57] ABSTRACT

Fabric is glued to a foam cushion, while design lines are formed in the cushion, by pressing a hot, perforated die against a layered composition of foam, hot melt adhesive, and fabric. Protruding ridges in the die are heated to a higher temperature than the land area. Superheated steam is ejected through the perforations, causing the foam to melt and form the design lines, and causing the layer of adhesive to become molten. The composition is then cooled, for example by pulling air through it, to resolidify the adhesive and the molten foam under the ridges. The process is useful for forming automobile seats. It requires less labor than forming the design lines by sewing, and without damaging the fabric.

21 Claims, 8 Drawing Sheets

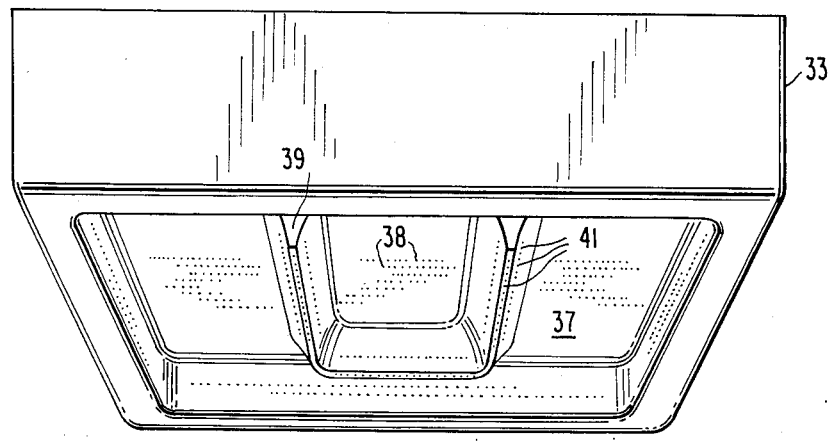
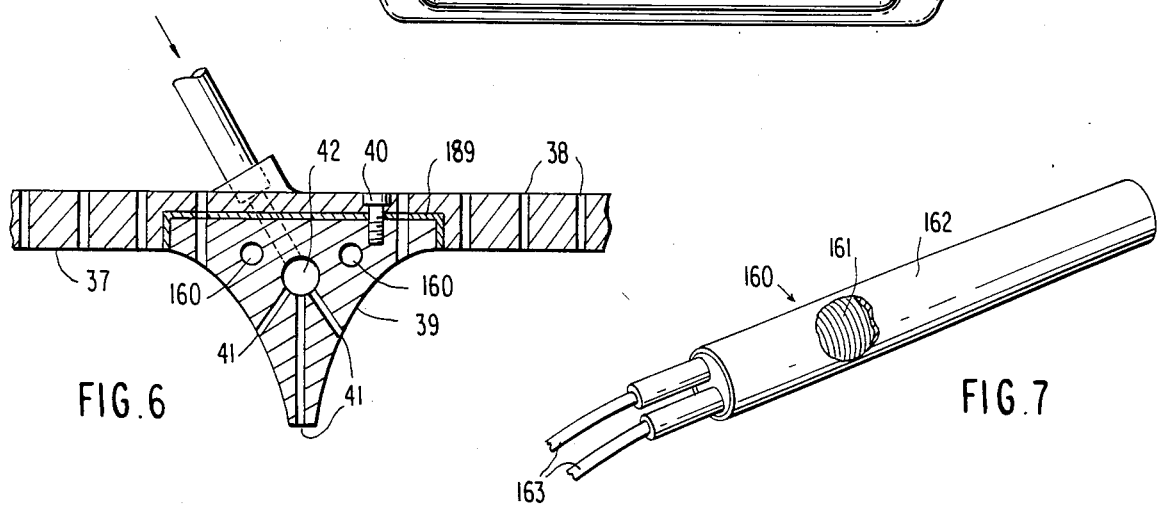
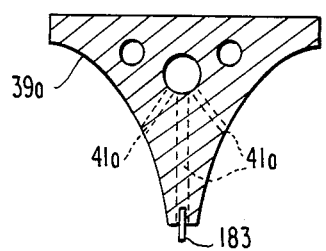
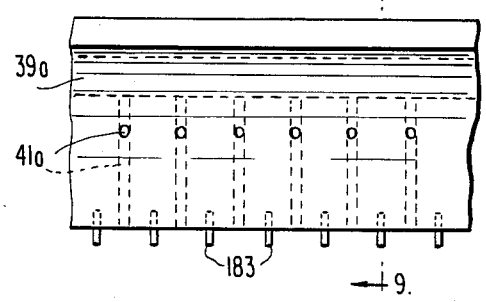
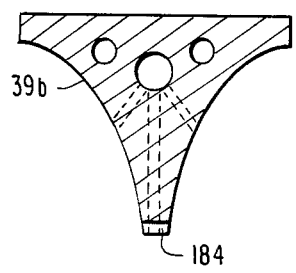
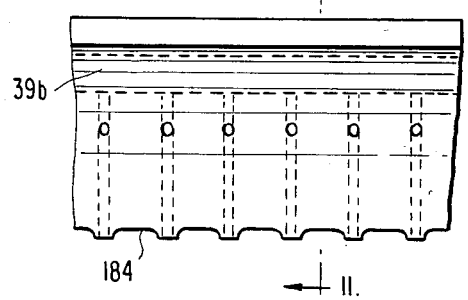

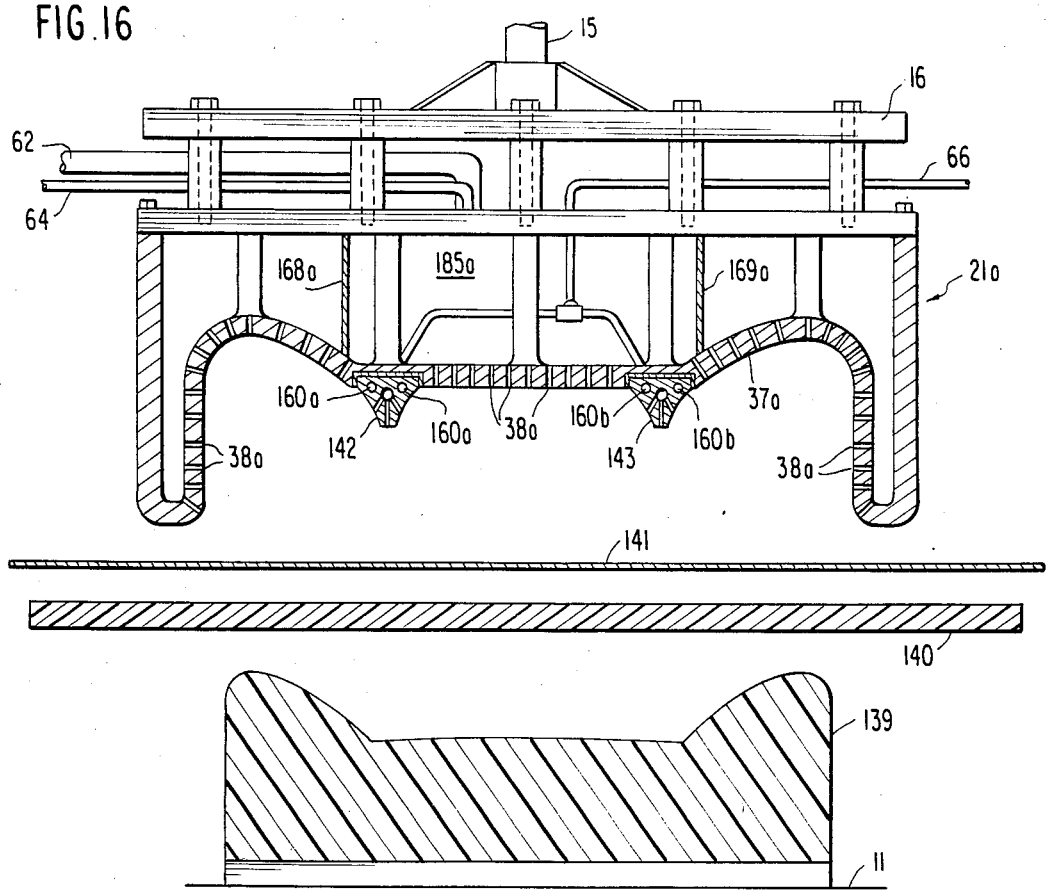
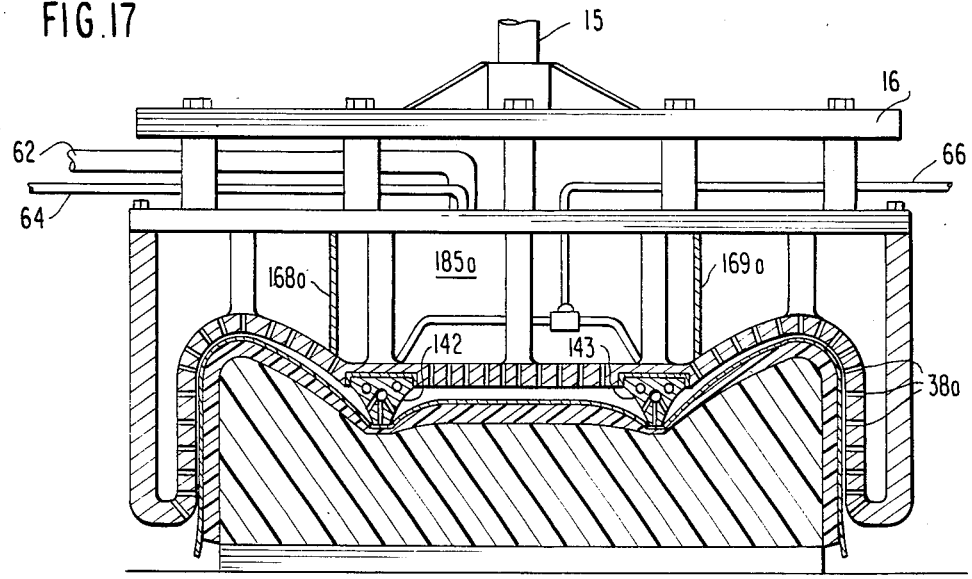

PROCESS FOR SHAPING AND COVERING CUSHION FOAM

This invention concerns a process and apparatus for shaping a piece of open cell cushion foam and simultaneously laminating upholstery fabric to the foam.

It is often desired to have indentations in upholstered foam cushions, especially when the cushions are to be used in automobile interiors. Such indentations are sometimes referred to as design lines. They are used, for example, to create channeled, bisquit, or quilted effects.

The conventional method of creating design lines is by sewing the fabric to the cushion, using a backing material, such as a scrim, on the underside of the cushion. The design lines are created by stitching that passes through the foam and is anchored to the backing material. The drawbacks of this process are that it is labor intensive and usually can be used only in the flat areas of the cushion.

A newer method involves forming the foam in a closed, heated mold, lined with the decorative face fabric. The mold cavity is in the desired shape of the finished cushion. An adhesive can be added to the foam-producing mixture to cause the fabric to laminate to the foam as it is formed. In this method, however, the face fabric must have moisture-proof backing. This restricts the ability of the cushion to "breathe". Also, the foam-forming chemicals have to be injected under high pressure into the mold cavity, which requires expensive fittings and equipment. And the cycle time of the molding process is relatively long, which makes it necessary to use many molds to support high production volumes.

Another method currently being used requires the impregnation of multiple layers of foam with a liquid adhesive. The layers of foam, covered with the fabric, are then treated with additional chemicals and placed in a heated mold. The chemicals must be accurately mixed and introduced into the foam in precise quantities. This process also is time-consuming and requires the construction of many molds to obtain normal production volumes. Moreover, some of the chemicals used are noxious and the treatment reduces the porosity of the foam, restricting air flow through the cushion.

The present invention is directed to a process and a machine for producing shaped pieces of foam covered with upholstery fabric, which works relatively quickly and without sewing. The process comprises the following sequential steps:

(a) placing the fabric over one side of the foam with a layer of hot melt adhesive in between the fabric and the foam, (b) preheating a die that has one or more protruding sections and one or more land areas on its contact surface, and which is perforated across substantially its entire contact surface, the preheating being conducted so as to bring the die's protruding section(s) to a higher temperature than the die's land area(s).

(c) pressing the preheated die against the fabric-covered side of the foam, causing the die's protrusion(s) to create one or more indentations in the foam, (d) ejecting a shot of vapor that has been superheated to a temperature substantially higher than the die's protruding sections through the perforations in the die at a pressure sufficient to drive the vapor through the fabric at least part way into the interior of the foam, the temperature of the vapor being high enough to melt the adhesive across substantially the entire contact surface and to cause the foam to become molten under the die's protruding section(s), (e) passing a cooling gas through the foam, until the adhesive and molten areas of the foam have resolidified, thereby laminating the fabric to the foam and permanently fixing the indentation(s) in the foam, and (f) disengaging the die and the resultant laminated, shaped composition.

Preferably, the cooling gas is ambient air which is pulled through the foam by the application of a vacuum to the foam.

An important condition of the process is using hot enough vapor that the foam in the region under the die's protruding sections will become molten. When the molten foam is subsequently cooled it resolidifies, making the indentations, or "design lines", permanent. The same cooling step causes the adhesive to resolidify, thereby securely laminating the fabric to the surface of the foam, and making it unnecessary to tack or sew the fabric in place around the edges.

The adhesive used in the present process has a melting point that is lower than that of the foam. As a result, the fabric in the land areas does not have to be subjected to as high a temperature as the fabric in the design lines. With certain fabrics and cushion designs this can provide an advantage. The feel or appearance of many decorative fabrics suffers if the fabric is pressed by a die while being subjected to a temperature high enough to melt the foam beneath it. The nap might become permanently crushed, for example, or colors in the fabric may migrate. The present process allows one to restrict any such distortions to the bottom of the design line indentations, where, for the most part, they will be unnoticeable.

Some fabrics subjected to the present process can withstand the heat and pressure under the die's protruding sections without suffering any apparent distortion, especially if the design line is rather wide, say one-half inch or more.

By preheating the die and using superheated vapor to melt the adhesive, vapor condensation on the fabric can be avoided. This reduces or eliminates spotting. Use of a vacuum to cool the adhesive aids in this objective, in that it removes the partially cooled vapor before condensation can occur.

In addition to speed and lower labor costs, another benefit of the present process is that it can form rounded corners in an upholstery fabric without creating folds or wrinkles. When steam is used as the superheated vapor, the fabric often is reshaped to make it conform exactly to the configuration of the die, which becomes the shape of the foam as well. The high temperature steam causes the fabric to relax and be deformed by the die. Fabrics we have successfully tested in this regard include both knits and woven fabrics. Circular jersey knits, raschel knits (both 44 gauge and 32 gauge), and tricot warp knits (2, 3, and 4-bar) have been used. The woven fabrics used include twills (both $2 \times 2$ and $2 \times 1$), flat wovens, and velours. The fibers successfully tried include polyether, nylon, rayon, wool, cotton, and elastomeric, or "stretch", fibers—alone and in various blends. Fabrics that include some amount of an elastomeric fiber work best in the present process. The best results will be achieved when practicing the present process if the fabric is held taut during the shaping and laminating operation. This minimizes the formation of folds and wrinkles in the final product.

The types of foam we have successfully tested in the process of the present invention are those composed of polyurethane, polyolefin, polyether, and polyester resins. Polyurethane and polyether foams often have melting points in the range of about 300° to 325° F. Polyethers melt higher, usually in the range of about 375° to 450° F. Polyolefin foams often have melt points somewhere in the range of about 325° to 400° F. The foam generally can be of any shape or thickness.

The adhesive used to laminate the fabric to the foam is a fabric adhesive which is substantially solid at room temperature and melts at an elevated temperature, e.g., about 140° F. or above. The melting point should not be so high that the fabric will be damaged by raising the temperature of the adhesive to that level. (Some fabrics can withstand temperatures as high as about 350° F., for short periods of time, without significant damage.) Different adhesives may be preferred for different applications. Most often, however, the adhesive will have a melting point within the range of about 190° to 250° F. To make finished seat cushions that meet the U.S. automotive industry's current wear requirements, use of an adhesive that melts in the range of about 220° to 240° F. is most preferred.

Any suitable way of interposing a layer of the adhesive between the fabric and the foam can be used. Thus, for example, instead of using separate adhesive, the fabric can be adhesive-backed, or the foam can be pre-coated with heat-activated adhesive.

Sufficient adhesive should be used to cover substantially the entire surface of the foam. If the adhesive is in particulate form, it can be sprinkled or otherwise applied to the foam. Use of a mesh or film of adhesive facilitates placement of the adhesive between the fabric and the foam.

Some commercially available foams especially designed for high temperature shaping have a heat-activated adhesive mixed inside them. These foams, sometimes referred to as "fast foams", also can be used in the present process. They are less desirable, however, because they are more expensive than the combination of plain foam and separate adhesive. Fast foams normally melt at a lower temperature, e.g., about 260° to 270° F.

The die should be preheated prior to being pressed against the layered composition of fabric, adhesive, and foam. Precisely how hot the die needs to be depends upon the melting point of the adhesive. The die temperature should be high enough to warm the adhesive to near its melting point. For most adhesives it will be preferred that the surface temperature of the land areas of the die be below the adhesive's melting point but within about 10 to 30 Fahrenheit degrees thereof, e.g., in the range of about 210° to 300° F.

The protruding sections of the die are heated to a higher temperature than the land areas. The protruding sections preferably will not be hot enough to independently cause the foam beneath them to melt, however. It is better to rely on the superheated vapor to raise the foam temperature that high. Often the protruding sections of the die will be heated to a temperature at least about 30 Fahrenheit degrees higher than the adjacent land area.

The preferred means of preheating the die is by use of electrical resistance heating. Preferably, the land areas and protruding sections will be separated by heat insulation, so as to provide an abrupt temperature change between the two zones.

The perforations in the die should be relatively small, e.g., having diameters in the range of about 0.035 to 0.065 inch. There should be enough of the perforations, and they should be spaced closely enough together, to insure relatively uniform heating of the adhesive. The smaller the perforations, the closer together they should be. Generally, the perforations should be spaced not more than about ½ inch apart.

The preferred superheated vapor is steam. The temperature, pressure, flow rate, and duration of ejection of the steam into the layered composition are to a certain extent interrelated. A combination of these conditions should be selected which will soften and relax the foam under the protruding sections, but not under the land areas. Generally speaking, the greater the depth of the indentation, the longer the duration of the steam ejection, or the higher the steam temperature, or both.

In the land areas the conditions have to be adequate to melt the adhesive under the fabric. Usually the steam will have to have a temperature in the range of about 400° to 750° F. and a pressure of about 70 to 90 pounds per square inch gauge (psig). (This is as measured before the steam contacts the die surface.) Often it will be preferred that the steam temperature be at least 650° F.

Steam of the same temperature and pressure can be sent to the land areas as that sent to the protruding sections, or the two zones can be supplied with separate sources of steam. The steam temperature drops as it passes through the holes in the contact surface of the die, which is at a lower temperature. The temperature drops less when passing through the holes in the protruding sections, however, since those sections are preheated to a higher temperature than the land areas are. Therefore, although a single source of superheated steam may be used, the steam that passes through the fabric in the design line areas will be at a significantly higher temperature than that which passes through the fabric in the land areas.

If desired, the land area of the die can be contoured, rather than perfectly flat. When the land area is contoured, the pressure of the superheated vapor used there has to be high enough to force some of the melted adhesive at least part way into the interior of the foam, so that, once the adhesive resolidifies, it will hold the foam in the shape imparted to it by the die. In this way, for example, the corners and edges of the piece of foam can be rounded, while at the same time covering them with the fabric. There is a practical limit to how far the molten adhesive can be driven into the interior of the foam, however—especially without using temperatures high enough to damage the fabric. In contrast thereto, the design lines can be made much deeper, since adhesive migration is not relied upon to hold their shape.

In certain applications of the present process it may be desired to create a high degree of contouring in the land areas of the foam. Bucket seats for automobiles are one example. The center section of the seat cushion may be relatively flat, except for the design lines, while the side edges slope upward at a fairly steep angle, forming what are sometimes referred to as "wings." Using the process of the present invention, such a product can be formed by laminating the fabric to a relatively thin foam pad, while simultaneously shaping the pad and laminating it, in turn, to a contoured base that also is composed of open cell cushion foam. The shape of the foam base can be a rough approximation of the desired final shape of the seat. The thinner top pad, when shaped by the die, can provide the precise contour desired. In this operation a layer of hot melt adhesive should be placed between the pad and the base, and the steam should be ejected for a long enough time to reach and melt the adhesive there. Similarly, the cooling gas should be passed through the foam for a long enough time to resolidify both the adhesive under the fabric and the adhesive between the pad and base. Since the steam that reaches the adhesive between the pad and base will be somewhat cooler, due to the greater distance it has traveled, it is preferred that the adhesive used there have a lower melting point than the adhesive between the pad and the fabric. If an adhesive of the same melting point is used in both places, there is a danger that the adhesive under the fabric will become so thin when heated by the vapor that a substantial portion of it will be absorbed into the foam pad, resulting in weak or no bonding of the fabric to the foam. Usuall this can be avoided if the melting points of the two adhesives differ by about 30 to 50 Fahrenheit degrees.

Often it will be desired when using a contoured base and a separate top pad, or "cap", that the base foam be harder than the top foam. The hardness of cushion foam can be expressed in ILD units, which stands for Indentation Load Deflection. As used in this specification, ILD units are expressed as lbs. per cubic foot, based on a one inch thick, 50 inch square, piece of foam. For comfortable seating, for example, the base might have a hardness in the range of, say, about 40 to 50 ILD, while the cap has a hardness at least about 10 or 20 percent lower than that of the base, e.g., in the range of about 20 to 40 ILD.

The cooling gas preferably is activated as soon as injection of the superheated vapor ceases. We are unaware of any criticality in the rate at which the cooling gas is passed through the foam. The greater the flow rate, however, the sooner the adhesive or adhesives will set. If the cooling gas is ambient air, and if it is pulled through the foam by application of a vacuum to the foam, a desirable vacuum strength range is about 5 to 8 inches of water, measured at an air flow rate of 750 cubic feet per minute (cfm).

If desired, the layered composition of foam, adhesive, and fabric can be compressed between a pair of complementary dies. The more severe the shaping to be done, the more advantageous it is to use both front and back dies. When complementary dies are used, preferably both will be perforated across substantially their entire contact surfaces. The vacuum preferably is pulled through the perforations in the second die, i.e., the one that presses against the opposite side of the foam from the fabric. This helps hold the workpiece in place. The vacuum can be applied through the perforations in both dies, however, if desired.

The apparatus we have designed for practicing the process of the present invention comprises the following elements:

(a) means for releasably holding a workpiece of resilient material, (b) one or two dies as described above, (c) means for pressing the first die against the workpiece while the workpiece is being held by the holding means, (d) means for preheating the die, which is operable to heat the die's protruding section(s) to a higher temperature than the die's land area(s), (e) means for ejecting a shot of superheated vapor through the perforations in the die, while the die is pressed against the workpiece, (f) means for passing a cooling gas through the workpiece while the die is pressed against it, and (g) means for disengaging the die and the workpiece so as to permit the shaped, covered workpiece to be withdrawn from the apparatus.

Preferably, each die will have an enclosed chamber behind its contact surface, and this chamber will be in communication with the perforations in the die and with a valved source of the superheated vapor. It is also preferred that a valved vacuum line be connected to the chamber behind the contact surface of each die.

To preheat each die it is preferred that one or more electrical resistance heater elements be attached to, or implanted in, the die. Preferably the preheat means will be opeaable to heat the die's land area to a temperature in the range of about 200° to 300° F., and to heat the protruding sections to a temperature at least about 30 Fahrenheit degrees higher than the land areas.

The apparatus preferably includes adjustable stop means for controlling the extent to which the die is pressed against the foam.

It is also preferred that the holding means be operable to hold the workpiece foam in a horizontal position, and that the first die be suspended above the place where the foam is held. Any rigid horizontal surface can serve as the holding means. If complementary dies are used, the holding means can be the second (or lower) die.

The pressing means can be operable to lower the die into contact with the workpiece. The pressing means can advantageously include one or more rack and pinion mechanisms for guiding the first die as it is lowered into contact with the foam. The disengaging means can operate to raise the die away from the foam.

The dies may be made of various metals; however, cast aluminum is preferred. The first die can be cast in one piece, or it can include one or more detachable, perforated protrusion sections for forming the design lines in the foam. An advantage of the latter arrangement is that it enables a single die to be adapted for use to create a variety of different designs, just by changing the protruding sections.

If desired, the protrusion sections of the die can have means on their contact surfaces for creating the appearance of stitching in the finished cushion. Such means include, for example, wire stubs embedded in the protrusion section or a scalloped configuration in the contact surface.

As an optional item, the apparatus may be equipped with frame means for holding the piece of upholstery fabric taut while it overlies the side of the foam against which the die is pressed. As discussed above, this is a useful feature when working with fabrics having low stretch values. Preferably the frame will carry clamps for releasably holding the fabric, and the frame will be mounted on springs, to give it some freedom of movement in the direction the die moves when it is pressed against the fabric.

For a fuller understanding of the apparatus and process of the present invention, reference is made to the drawings that accompany this specification. They depict a preferred embodiment of the apparatus and show how it works.

Referring to the drawings:

FIG. 5 is a bottom perspective view of the lower die.

FIG. 6 is an enlarged sectional view of a portion of the upper die, which contains a detachable ridge section for forming a design line in the foam pad.

FIG. 7 is an enlarged isometric perspective view (partially broken away) of one of the cartridge heaters embedded in the detachable ridge section depicted in FIG. 6.

FIG. 8 is a partial sectional view of a ridge section of a different configuration that can be used in place of that depicted in FIGS. 5 and 6.

FIG. 9 is a sectional view, taken along the line 9—9 in FIG. 8, of the alternative ridge section shown in FIG. 8.

FIG. 10 is a partial sectional view of a ridge section of still another configuration that can be used in place of that depicted in FIGS. 5 and 6.

FIG. 11 is a sectional view, taken along the line 11—11 in FIG. 10, of the alternative ridge section shown in FIG. 10.

FIG. 16 is a front view, in partial cross-section, of a differently shaped upper die than that depicted in FIGS. 1-7, 12, and 13, used without a lower die. Also, FIG. 16 shows the layered workpiece of FIG. 15, in position to be shaped and laminated.

FIG. 17 depicts the upper die of FIG. 15 pressed against the layered workpiece.

Figure 1:
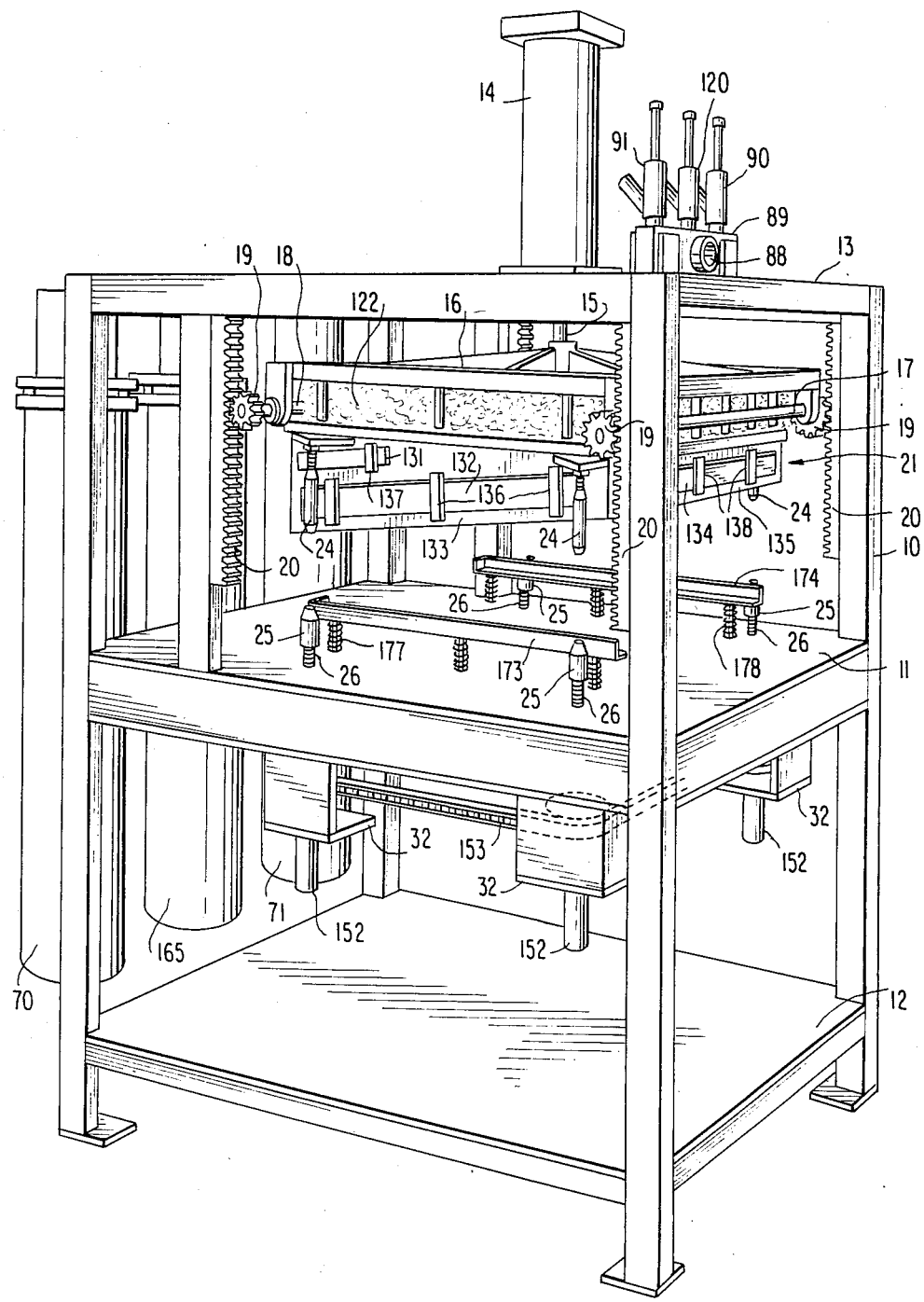
FIG. 1 is an isometric perspective view of the apparatus, using only an upper die. For ease of viewing, the piping that brings superheated steam and vacuum to the die is omitted in this view.

The apparatus shown in the drawings comprises a four-legged frame 10 with an upper shelf 11, a bottom shelf 12, and a top 13. Mounted on top 13 is an operating cylinder 14, which drives a vertically reciprocable piston 15. Attached to the bottom end of piston 15 is die holding plate 16. Rotatable shaft 17 is mounted on the front of plate 16. A parallel shaft 18 is mounted on the rear of plate 16. On all four ends of shafts 17 and 18 are fastened pinions 19. Vertically aligned racks 20 are mounted between top 13 and upper shelf 11 to mesh with each of the four pinions 19. This rack and pinion mechanism serves to keep plate 16 from twisting or tilting as it is raised or lowered.

Figure 3:
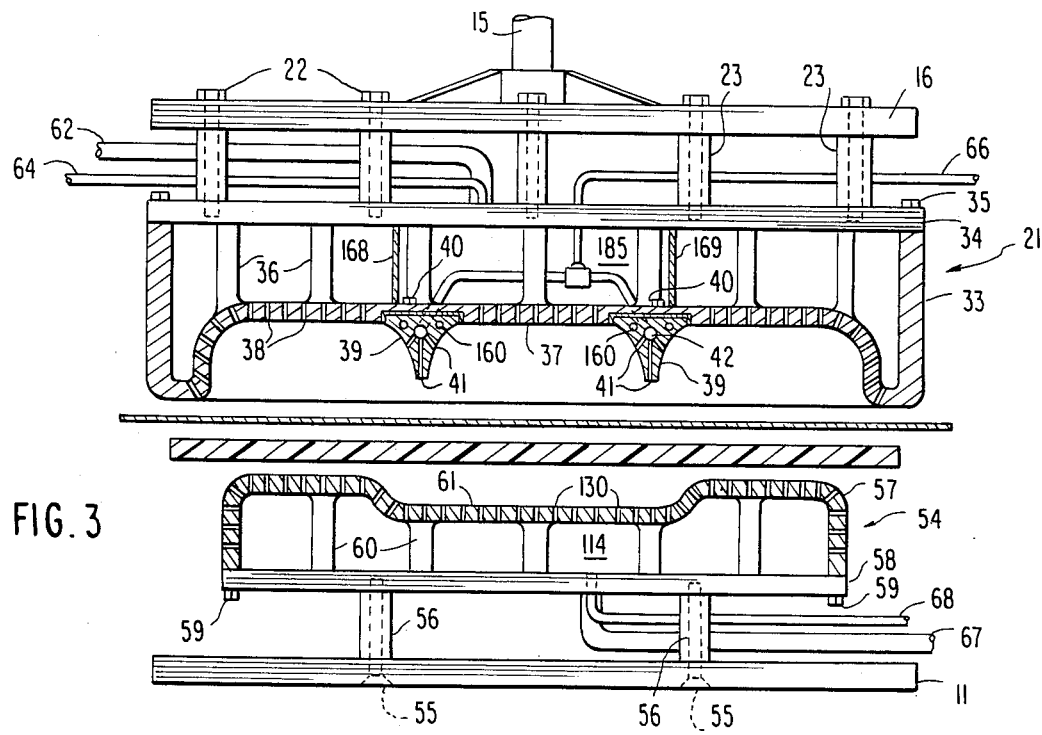
FIG. 3 is a front view, partially cut away, of the upper and lower dies, with the insulation removed, showing a fabric-covered foam pad in position to be worked upon.

As best seen in FIG. 3, top die 21 is held to plate 16 by bolts 22. Spacer collars 23 hold plate 16 and die 21 apart, so as to leave space for flexible piping that communicate with the interior cavity 185 of die 21.

Figure 19:
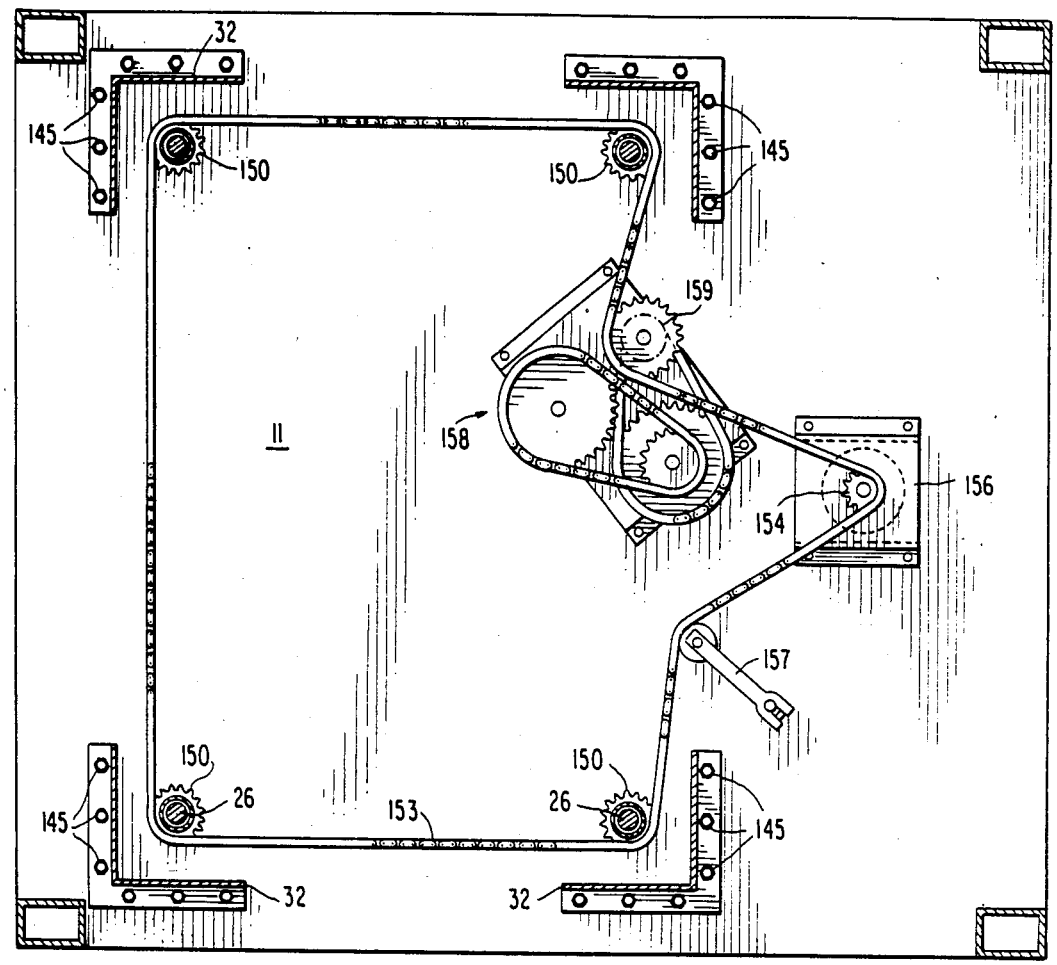
FIG. 19 is a bottom sectional view, taken along the line 19—19 in FIG. 18.
Figure 18:
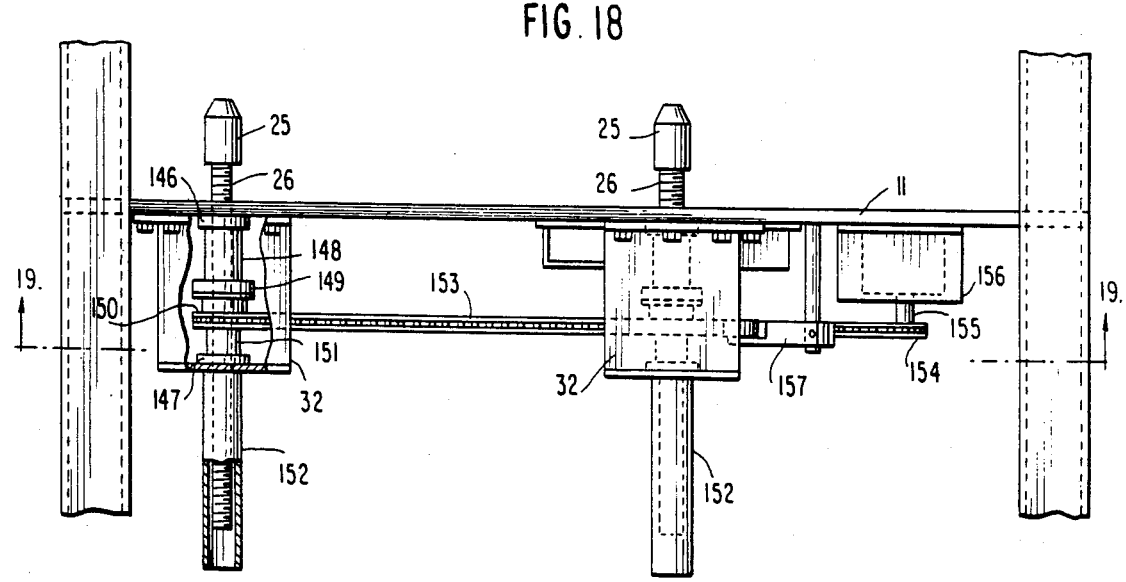
FIG. 18 is an enlarged side elevation (partially broken away) of top shelf 11 (FIG. 1) and the positioning assembly for bottom stops 25.

As illustrated in FIG. 1, four adjustable stops 24 are mounted near the four corners of upper forming die 21. As seen in FIGS. 1, 18, and 19, mounted on upper shelf 11 are four cooperating bottom stops 25. Each bottom stop 25 is mounted on a threaded shaft 26. Each shaft 26 passes through shelf 11 and housing 32, which is held to shelf 11 by screws 145. A pair of thrust bearings 146 and 147 are carried by housing 32. Shaft 26 is threaded through ball nut 148. Flange 149 of ball nut 148 is fastened to sprocket wheel 150. Spacer sleeve 151 is attached to the opposite side of sprocket wheel 150. The upper end of ball nut 148 rides inside thrust bearing 146. The lower end of spacer sleeve 151 rides inside thrust bearing 147. The mechanism works in the following way. As sprocket wheel 150 is turned, ball nut 148 turns wtth it. Ball nut 150 has ball bearings (not shown) inside it that ride between the threads, making it a very low friction nut. Thus, as ball nut 148 turns, shaft 26 moves axially, without rotating. The lower end of shaft 26 is encased in a protective cover 152.

If necessary, a slot and key arrangement (not shown) can be provided to ensure that shaft 26 does not rotate when ball nut 148 is turned. Thus, for example, a longitudinal slot can be cut in the surface of shaft 26, and a key member which rddes in the slot can be fastened to shelf 11. This will permit shaft 26 to move axially, but not turn.

Each sprocket wheel 150 is driven by drive chain 153, which, in turn, is driven by drive sprocket 154. Drive sprocket 154 is mounted on drive shaft 155 of direct current stepper motor 156. The tension in drive chain 153 is set by tension adjuster 157.

Indicated generally by reference numeral 158 in FIG. 19 is a pulse generator that is electrically connected to stepper motor 156 (connection not shown). Generator 158 works by energizing stepper motor 156 just long enough for a preset number of teeth on sprocket wheel 159 to pass by a sensor (not shown). Once wheel 159 has rotated that amount, motor 156 is deenergized. In this manner all four bottom stops 25 can be raised or lowered in unison a precise, incremental amount. The shortest amount is that produced by the rotation of sprocket wheel 159 the distance of just one tooth.

Figure 4:
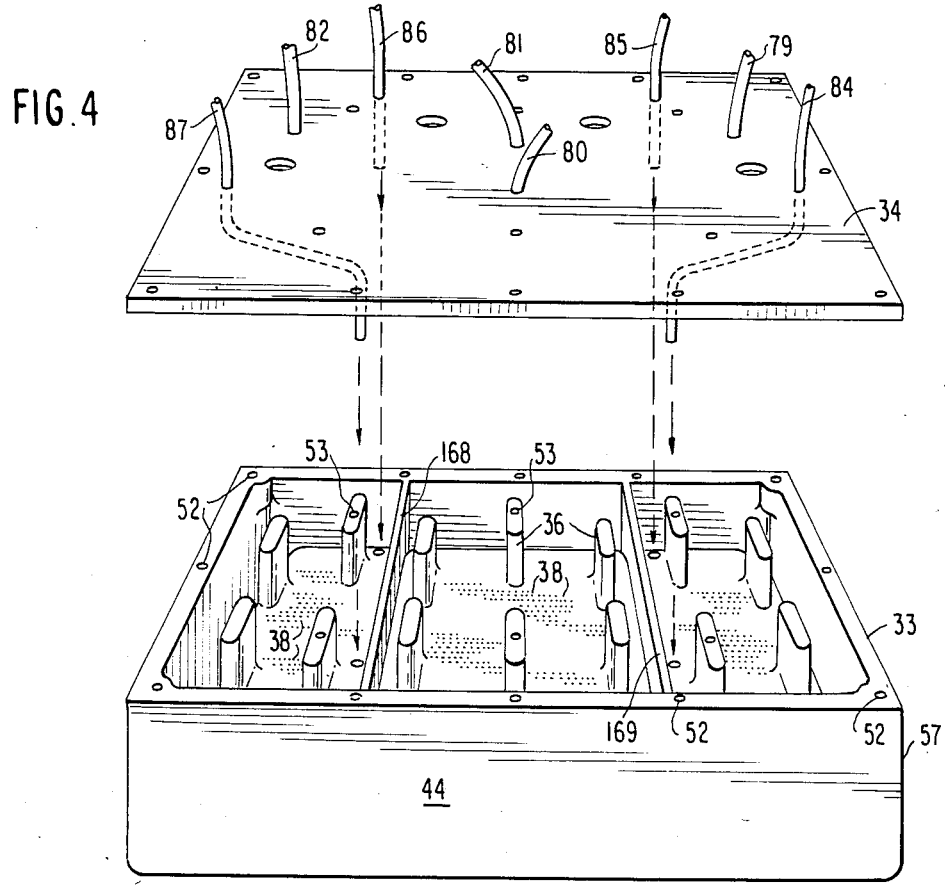
FIG. 4 is a top perspective view of the upper die with its cover raised.

As can be seen in FIGS. 3, 4, and 5, upper die 21 is comprised of a cast aluminum forming tool 33 with a detachable cover plate 34. Cover plate 34 is held to forming tool 33 by bolts 35, which are threaded into holes 52 in the corners and sides of tool 33 and into holes 53 in the support posts 36. Posts 36 provide structural stablity for upper die 21 and efficient heat transfer from electrically heated cover 34. The contact surface 37 of tool 33 is perforated. The preferred size and spacing of the holes 38 will vary according to the foam and fabric used, but, for example, as shown in FIGS. 3, 4, and 5, the holes 38 may be on a 0.375 inch grid and have a diameter of 0.050 inch.

On the underside 37 of tool 33 is mounted a U-shaped ridge section 39, which is held in place by bolts 40 (shown in FIGS. 3 and 6). Ridge section 39 is perforated wtth three rows of holes 41, all of which communicate with interior steam tunnel 42. Steam tunnel 42 runs substantially the entire length of ridge section 39. The joint between die underside 37 and ridge section 39 is sealed by a layer of Marinite ® insulation 189, which serves as a thermal insulator between the two parts.

Embedded in ridge sections 39 are identical cartridge heaters 160, which generally lie parallel to steam tunnel 42. As can be seen in FIG. 7, heater 160 is composed of resistance wire 161, made, for example, of a nickel-chromium alloy, which is wound on a supporting core (not shown) of dielectric material. Metallic sheath 162 is lined with magnesium oxide electrical insulation (not shown). Leads 163 are connected to resistance coil 161 and to a rheostat-controlled source of alternating current electricity (not shown).

Figure 2:
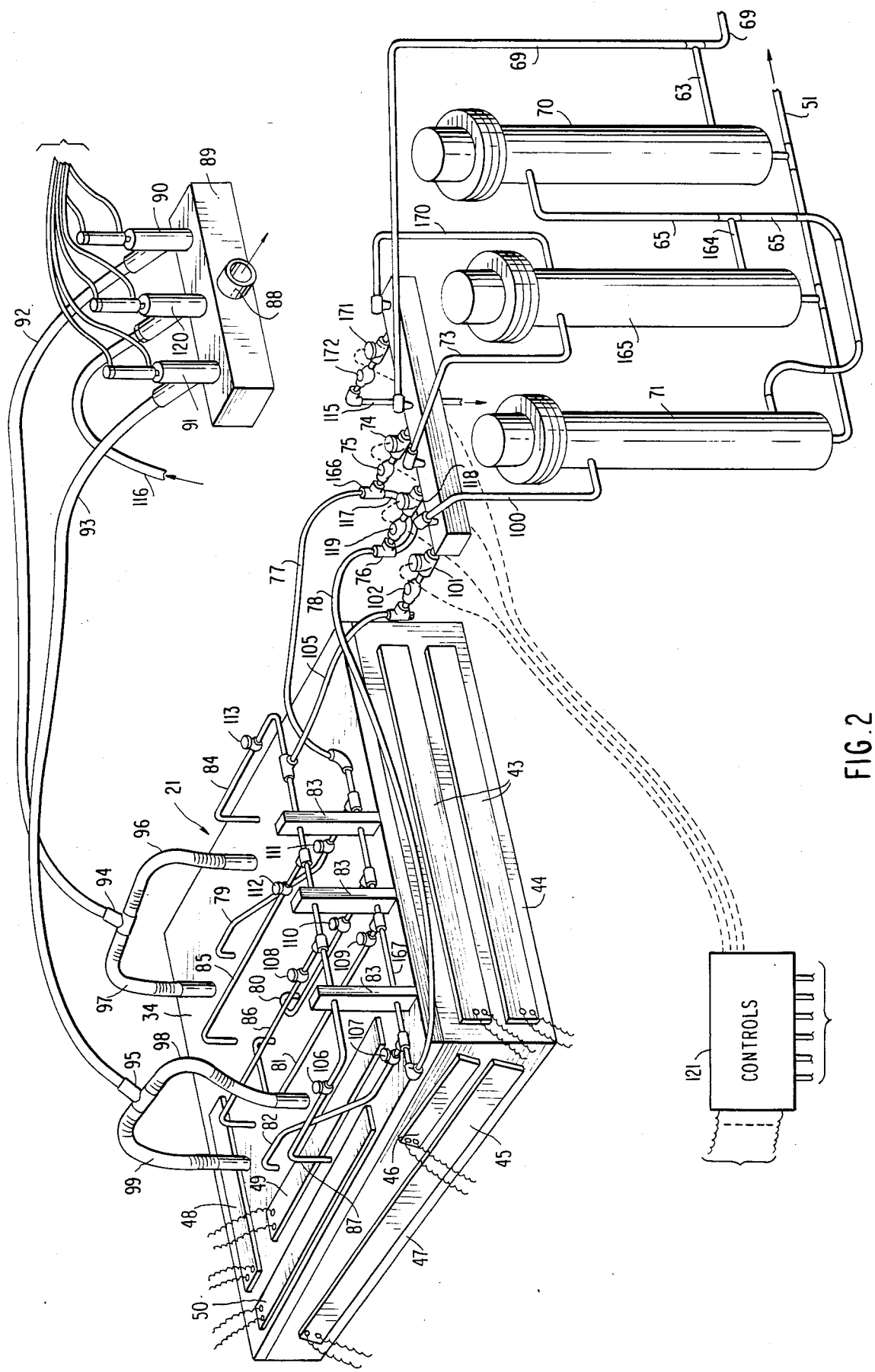
FIG. 2 is an isometric perspective view of the piping and controls for bringing superheated steam and vacuum to the upper die depicted in FIG. 1.

Electrical resistance heaters are attached to all four sides of tool 33, as well as to its cover plate 34. Illustrative heaters are shown in FIGS. 1 and 2. Thus, electric heaters 43 are attached to the rear 44 of tool 33; electrical heaters 45 and 46 are attached to one side 47 of tool 33; electrical heaters 131 and 132 are attached to the other side 133 of tool 33; electrical heater 134 is attached to the front 135 of tool 33; and electrical heaters 48, 49, and 50 are attached to the die cover plate 34. Straps are used to hold the heaters in place. This is illustrated in FIG. 1, where straps 136 hold heater 132, strap 137 holds heater 131, and straps 138 hold heater 134.

As illustrated in FIG. 3, lower die 54, which is complementary to upper die 21, is mounted to upper shelf 11 by machine screws 55 and spacer collars 56. Lower die 54 consists of cast aluminum tool 57 and aluminum cover plate 58, which are held together by bolts 59. Tool 57 has integrally formed posts 60 which provide structural stability and enhanced heat transfer for die 54. The entire contact surface 61 of lower die 54 is perforated with holes 130, which are of the same diameter and spacing as holes 38 in upper die 21. Although not shown in the drawings, electrical resistance heaters are also attached to all four sides of tool 57 and to the outside of cover plate 58.

In FIG. 3, as indicated schematically, and partially broken away, two types of lines supply the interior cavity 185 between the cover plate 34 and tool 33 of upper die 21. These are vacuum iine 62 and superheated steam line 64. Tunnel 42 in ridge section 39 is supplied by superheated steam line 66. Lower die 54 is supplied by vacuum line 67 and superheated steam line 68.

Referring to FIG. 2, saturated plant steam is supplied to the apparatus by line 69. A side stream 63 is conducted to pressure vessel 70, wherein it is partially superheated by an electrical resistance heater (not shown). Steam from vessel 70 is conveyed by line 65 to a second pressure vessel 71, wherein it is heated further by an electrical resistance heater (not shown). A side stream 164 is conducted to parallel pressure vessel 165, wherein the steam also is heated further by an electrical resistance heater (not shown). The superheated steam from pressure vessel 165 is sent via line 73, solenoid valve 118, check valve 119, splitter 76, flexible trunk line 78, and branch lines 79, 80, 81, and 82 to die cavity 185. (In this function branch lines 79, 80, 81, and 82 equate with superheated steam line 64, shown schematically in FIG. 3.) The superheated steam from pressure vessel 71 is routed to tunnel 42 in ridge section 39 by line 100, solenoid valve 101, check valve 102, flexible trunk line 105, and branch lines 84, 85, 86, and 87. (In this function branch lines 84-87 equate with superheated steam line 66, shown schematically in FIG. 3.) Condensate is removed from vessels 70, 71, and 165 by line 51.

Saturated steam is supplied through line 69, solenoid valve 74, check valve 75, splitter 166, and flexible trunk line 77 to the same branch lines 79, 80, 81, and 82 that carry superheated steam from vessel 71 to die cavity 185. Splitters 76 and 166 are connected by a shunt 117. This allows the saturated steam from line 69 to be blended with the superheated steam from pressure vessel 165. Also, when valve 74 is closed and saturated steam is not being admitted to the die cavity, shunt 117 permits the superheated steam from vessel 165 to be split into two streams, which are delivered simultaneously, via trunk lines 77 and 78, to both ends of manifold line 167, which feeds branch lines 79 through 82. This provides more uniform heating of die cavity 185.

The purpose of having means for sending a blend of saturated and superheated steam to die cavity 185 is to permit close control of the temperature of the steam being ejected from die 21. By altering the blend of the two streams, the steam temperature in manifold line 167 can be precisely adjusted. This, in turn, permits one to control the moisture content in the fabric. The lower the temperature of the blended steam, the more moisture it will impart to the fabric, which can be important in preventing shine or overheating during the forming operation.

Vacuum pulled through trunk line 88 is connected to die cavity 185 via manifold 89, valves 90 and 91, hoses 92 and 93, splitters 94 and 95, and flexible branch lines 96, 97, 98, and 99. (Branch lines 96-99 equate with vacuum line 62, shown schematically in FIG. 3.)

Braces 83 hold branch lines 79-82 and 84-87 to die cover plate 34. Manual control valves 106-113 adjust the flow in branch lines 79-82 and 84-87.

Although not illustrated in FIG. 2, lower die cavity 114 similarly is connected to superheated steam line 115 and to vacuum line 116. The superheated steam in line 115 is supplied by pressure vessel 165 via line 170, solenoid valve 171, and check value 172. The vacuum pulled through line 116 is controlled by vacuum valve 120.

As seen in FIGS. 3 and 4, chamber 185 in upper die 21 is divided into three sections by walls 168 and 169. Line 79 supplies steam to the right section; lines 80 and 81 supply steam to the center section; and line 82 supplies steam to the left section. Similarly, vacuum line 96 serves the right section, vacuum lines 97 and 99 serve the center section, and vacuum line 98 serves the left section. Use of such chamber partitions is optional, but it allows one to create three different temperature zones in the land area of the contact surface 37 of die 21. This can be useful if more contouring of the workpiece is to be performed in one zone than another. Where more contouring is to take place, a higher volume of steam can be ejected, to make certain the adhesive is driven far enough inside the foam to bond the compressed cells together. Steam volume is regulated by manual control valves 106 through 113, each of which is pre-set before the shaping nnd covering operation.

Control panel 121, shown schematically in FIG. 2, is operatively connected to solenoid valves 74, 101, 118, and 171, to vacuum valves 90, 91, and 120, and to electric heaters 43, 45, 46, 48, 49, and 50. In addition, the electric heaters (not shown) on the outside of lower die 54 also are connected to control panel 121.

As shown in FIG. 1, glass wool insulation 122 is packed around all of the hot air and superheated steam lines entering top 34 of upper die 21. Similar insulation (not shown) is packed around the superheated steam line 68 entering lower die 54.

Figure 20:
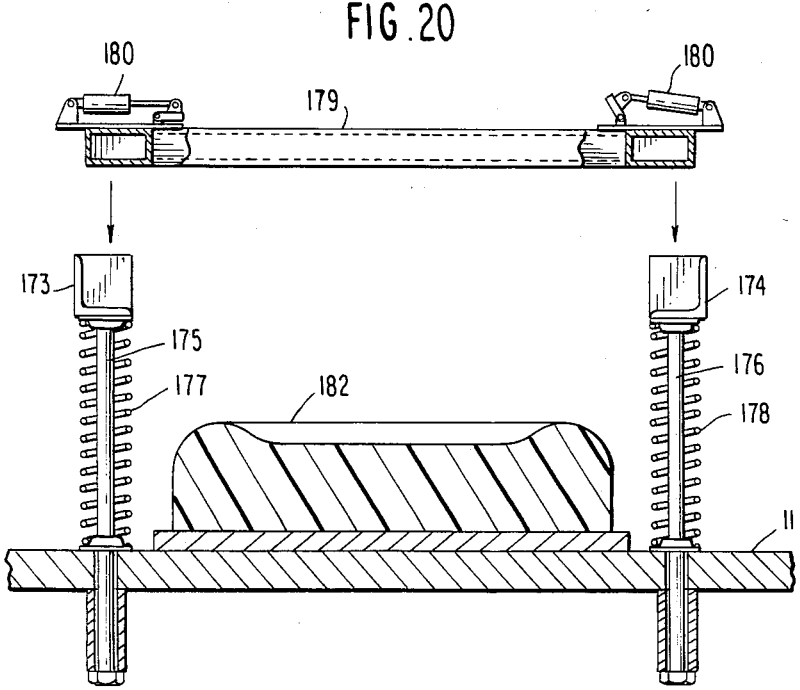
FIG. 20 is an enlarged front view of the fabric frame support structure shown mounted on shelf 11, in FIG. 1. Also shown in this Figure is the fabric frame itself, about to be lowered into position on the support structure.

As seen in FIGS. 1 and 20, a pair of rails 173 and 174, carried by spindles 175 and 176, are mounted on top shelf 11. Spindles 175 and 176 are slidably inserted in holes in shelf 11; compression springs 177 and 178 hold the spindles up.

Figure 21:
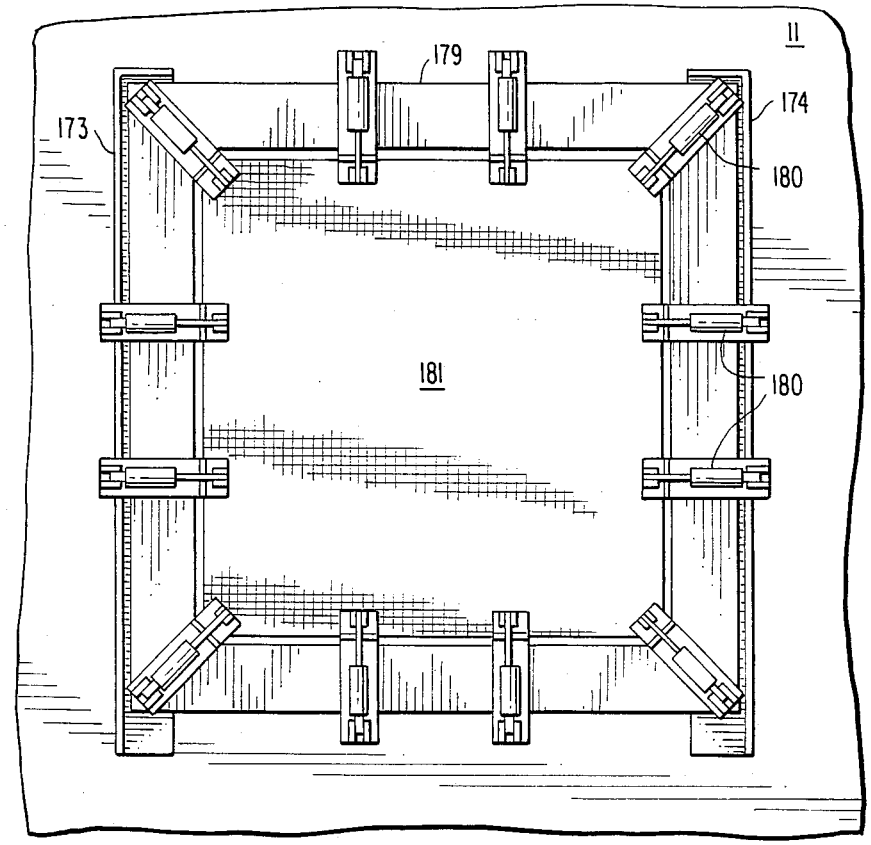
FIG. 21 is a top view of the frame assembly shown in FIG. 20, with a piece of fabric held taut in the frame.

Rails 173 and 174 serve as supports for square fabric frame 179. Around the top surface of frame 179, as illustrated in FIGS. 20 and 21, are mounted pneumatically operated clamps 180. A square of fabric 181 can be held taut in clamps 180; then, when upper die 21 is lowered onto foam workpiece 182, fabric 181 will be stretched tight over the workpiece. The heat of the die and the subsequent ejection of superheated steam will impart the contour of the die to the fabric. Because it is under tension, the contouring of the fabric will be more pronounced, leaving fewer creases and wrinkles in the rounded corners.

EXAMPLE 1

FIGS. 3, 11, 12, and 13 depict the use of the apparatus of the drawings to laminate fabric 123 to foam pad 124, and simultaneously shape the pad. Although not shown in the drawings, a layer of powdered adhesive is interposed between fabric 123 and foam pad 124. Referring to these drawings, the following is an illustration of how the process can be conducted.

The land area of contact surface 37 of upper die 21 is heated to a temperature of about 240° F. by the electric heaters shown in FIGS. 1 and 2, while the die is in the raised position shown in FIGS. 1 and 3. Similarly, the contact surface 61 of bottom die 54 is heated to about 200° F. In ridge section 39, however, the cartridge heaters are activated to raise the section's surface temperature to about 280° F. Referring to FIG. 2, solenoid valves 74, 101, 118, and 171 and vacuum valves 90, 91, and 120 are all cloeed. Manual control valves 106–113 are all open. Foam 124, a layer of the powdered adhesive (not shown), and fabric 123 are placed on lower die 54, as shown in FIG. 3. Foam 124 is a one inch thick pad of open cell, high resiliency polyether; it is very soft having a hardness of only about 24 ILD. The adhesive used is Rilson No. 5000 polyamide. It has a particle size range of 200–500 microns and melts at about 220°–240° F. It is applied to foam 124 at rate of about 0.6 ounce per square yard. Fabric 123 is a woven velour, composed 65% of polyester and 35% of Lycra ® spandex; it has a stretch valve of approxiamtely 35 percent.

Saturated plant steam at 300° F. and 80 psig is fed via lines 69 and 63 into pressure vessel 70, where it is heated to about 400° F. and 80 psig. A portion of that steam is piped via lines 65 and 164 to pressure vessel 165, where it is further heated, to about 400° F. and 80 psig (measured at the entrances to die cavities 185 and 114). The other portion of the stea heated in vessel 70 is sent via line 65 into pressure vessel 71, in which it is brought to a temperature of about 600° F. and a pressure of about 80 psig.

Figure 12:
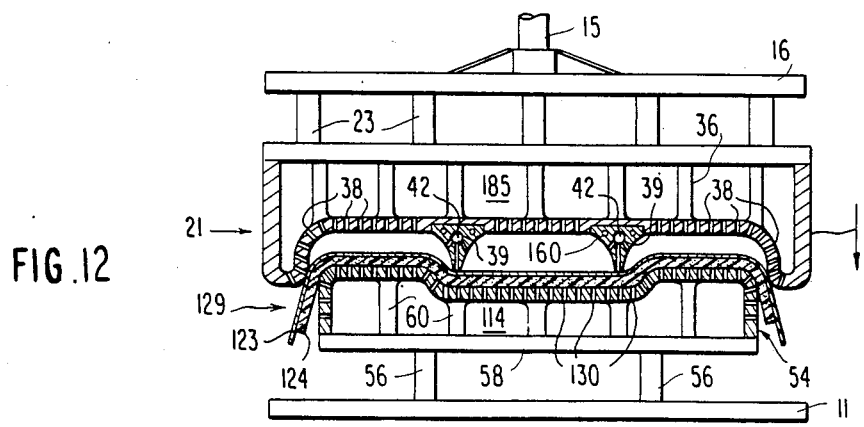
FIG. 12 shows complementary upper and lower dies, in partial cross-section, just barely making contact with the layered composition between them.
Figure 13:
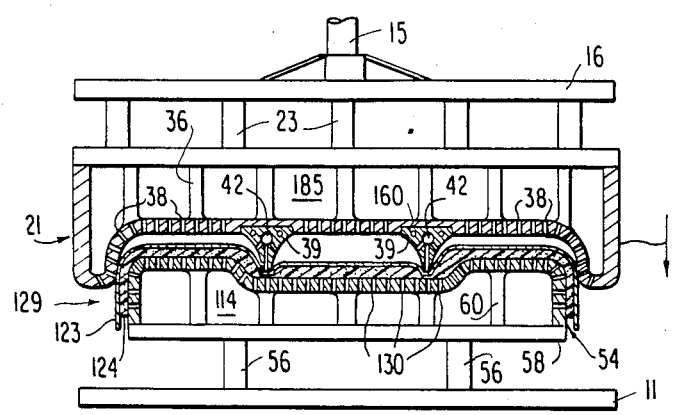
FIG. 13 shows the layered composition of fabric, adhesive and foam fully compressed between the upper and lower dies depicted in FIG. 12.

As shown in FIG. 12, hot upper die 21 then is partially lowered onto the layered composition of fabric, adhesive, and foam pad (shown generally in FIGS. 12 and 13 as workpiece 129). This begins the treatment cycle. Die 21 only lightly touches workpiece 129 at this point, for example just enough for ridge section 39 to depress the workpiece about one-eighth of an inch. Solenoid valve 101 is opened, allowing 600° F. steam from vessel 71 to enter tunnel 42 in ridge section 39. After five seconds, die 21 is fully lowered against workpiece 129, as shown in FIG. 13. The purpose of this 5 second steaming treatment through the ridge section only is to allow the foam to become molten as the top die is lowered into the workpiece.

The fully lowered upper die 21 creates about a one-inch indentation in workpiece 129, beneath ridge section 39. As soon as die 21 is fully lowered, solenoid valve 74 is also opened, which lets saturated steam (300° F.) into upper die cavity 185. This moistens the fabric and prevents against crushing of the nap by the subsequent lamination operation. This pretreatment with saturated steam is not always necessary, but it is advantageous when working with high velours and other deep nap fabrics. Ten seconds into the cycle, solenoid valve 74 is turned off and solenoid valve 118 is opened, releasing the 400° F. superheated steam from vessel 165 into die cavity 185.

Solenoid valve 171, which controls the flow of superheated steam from vessel 165 to lower die 54, is opened 15 seconds into the cycle.

Figure 14:
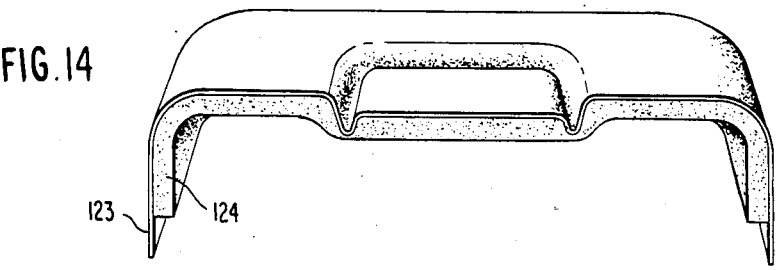
FIG. 14 is a top perspective view of the shaped, laminated article produced by the apparatus depicted in FIGS. 1-7, 12, and 13, but cut in half to show its inner structure.

Twenty-five seconds into the cycle all steam is shut off by simultaneously closing solenoid valves 101, 118, and 171, and vacuum valve 120 is opened to pull a vacuum through the perforations 130 in lower die 54. A vacuum measuring 7 inches of water at 750 cfm is used. At thirty seconds into the cycle upper die 21 is disengaged from workpiece 129 and returned to its raised position. After die 21 has been fully raised, vacuum value 120 is closed, ending the operation. The resulting laminated, shaped cushion shown in FIG. 14 is lifted off lower die 54 and withdrawn from the apparatus. The cushion is suitable for use as a cap for an automobile seat. The fabric 123 is substantially free of wrinkles, even at the corners. If it were separated from the foam pad 124, the fabric would retain the shape of the pad, much as if it had been knitted into that configuration.

As illustrated in FIG. 14, the bottom of the design line in the cushion prepared using the ridge section 39 shown in FIG. 6 is smooth. If it is desired to create a stitching effect, a ridge section such as those shown in FIGS. 8 through 11 can be used.

FIGS. 8 and 9 depict a ridge section 39a that has a row of solid pins 183, made of stainless steel, protruding from its bottom edge. The pins have a diameter of about 0.030 inch and protrude about 0.060 inch. When the hot die is pressed against the fabric and foam workpiece, and the superheated steam is ejected through perforations 41a, the hot pins 183 cause a row of permanent indentations to be left in the fabric and foam, which simulates the appearance of stitching.

Ridge section 39b in FIGS. 10 and 11 has a scalloped bottom edge 184, which also creates a stitching effect in the design line of the finished cushion.

EXAMPLE 2

Figure 15:
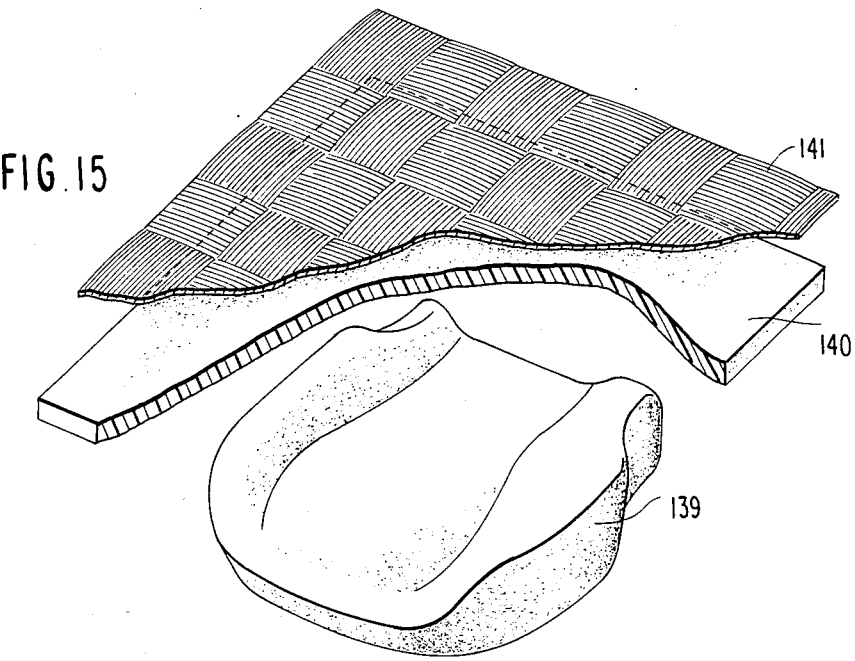
FIG. 15 is an exploded isometric perspective view, partially broken away, of a layered workpiece, consisting of base, top pad, and fabric, for use in preparing the seat cushion for an automobile bucket seat, using the process and apparatus of the present invention.

To simultaneously shape and laminate the layered workpiece shown in FIG. 15, upper die 21a (shown in FIGS. 16 and 17) is attached to die holding plate 16, in place of upper die 21 (shown in FIGS. 1–5, 11, and 12). The chamber 185a in upper die 21a is partitioned by walls 168a and 169a into right, left, and center sections. Base 139 is made of open cell polyether foam having a hardness of 45 ILD. Cap piece 140 is made of the same one-inch thick polyether foam used in Example 1. Fabric 141 is the same as the fabric used in Example 1.

To laminate fabric 141 to cap piece 140, a layer of the same adhesive as used in Example 1 (not shown) is applied to the top of cap piece 140 at a rate of about 0.6 to 0.8 ounce per square yard. To laminate cap piece 140 to base 139 a lower melting polyamide adhesive (not shown) is used, which has a melting point range of approximately 200° to 220° F. The latter adhesive is applied to the underside of cap piece 140 also at a rate of about 0.6 to 0.8 ounce per square yard.

Prior to the shaping and laminating operation, upper die 21a is heated to a contact surface temperature of about 220° F. in the land areas, using the external electric heaters shown in FIGS. 1 and 2. Ridge sections 142 and 143 are heated to a higher temperature, about 250° F., by cartridge heaters 160a and 160b. As shown in FIG. 16, base 139 is placed on shelf 11 and no lower die is used. The operation cycle proceeds as follows:

| Time into the Cycle | Event/Conditions |
| --- | --- |
| 0 secs.: | Die 21a is lowered into partial contact with layered workpiece, so ridge sections 142 and 143 indent cap piece 140 about 0.125 inch. Superheated steam at 600° F. and 80 psig is begun to be ejected through ridge sections 142 and 143 and is left on for 25 seconds. |
| 5 secs.: | Die 21a is fully lowered onto workpiece, as shown in FIG. 17. Ejection of saturated steam (300° F. 80 psig) is begun through perforations 38a in contact surface 37a of die 21a and is also left on until 25 seconds into the cycle. |
| 10 secs.: | Ejection of superheated steam (500° F., 80 psig) is begun through perforations 38a in contact surface 37a of die 21a. Control valves for right and left sections of chamber 185a have been pre-set to allow about a 50% higher steam flow to those sections than to the center section (about 65 lbs. per hour). |
| 25 secs.: | All steam is turned off and vacuum (approximately 7 inches water at 750 cfm) is begun to be pulled through perforations 38a in die 21a. |
| 30 secs. | Vaccum is turned off and die 21a is raised away from the workpiece, ending the cycle. |

The resultant upholstered, shaped cushion can be used as the seat cushion for a bucket style seat in an automobile.

We claim:

1. A process of forming one or more permanent indentations in a piece of open cell, thermoplastic, cushion foam and simultaneously laminating steam-permeable fabric thereto, comprising the following steps:

(a) placing the fabric over one side of the foam with a layer of hot melt fabric adhesive in between the fabric and the foam, the adhesive having a lower melting point than that of the foam, (b) preheating a die that has one or more protruding sections and one or more land areas and which is perforated across substantially its entire contact surface, the preheating being conducted so as to bring the land area(s) to a temperature that is elevated but is below the melt point of the adhesive, and to bring the die's protruding section(s) to a higher temperature than the die's land area(s), (c) pressing the preheated die against the fabric-covered side of the foam, causing the die's protrusion(s) to create one or more indentations in the foam, (d) ejecting a shot of steam that has been superheated to a temperature substantially higher than the die's protruding section(s) through the perforations in the die at a pressure sufficient to drive the steam through the fabric at least part way into the interior of the foam, the temperature of the steam being high enough to melt the adhesive across substantially the entire contact surface and to cause the foam to become molten and reshaped in the indentation(s), substantially without becoming molten in the land area(s), (e) passing a cooling gas through the foam, until the adhesive and the molten areas of the foam have resolidified, thereby laminating the fabric to the foam and permanently fixing the indentation(s) in the foam, and (f) disengaging the die and the resultant laminated, shaped composition.

2. The process of claim 1 wherein, in step (b), the land area(s) of the die is/are contoured and, in step (d), the pressure of the vapor is high enough to force some of the melted adhesive at least part way into the interior of the foam, so that when, in step (e), the adhesive resolidifies, it will fix the foam in the shape imparted to it by said contoured land area(s) of the die.

3. The process of claim 2 wherein the vapor used in step (d) is steam at a temperature of about 400° to 750° F.

4. The process of claim 3 wherein, in step (b), the die's land area(s) is/are preheated to a temperature in the range of about 200° to 300° F. and the die's protruding section(s) is/are preheated to a temperature at least about 30 Fahrenheit degrees higher than the land area(s).

5. The process of claim 4 wherein the foam is composed of a polyurethane, polyolefin, polyether, or polyester resin.

6. The process of claim 5 wherein, in step (d), the steam is ejected at a pressure of about 70 to 90 pounds per square inch gauge.

7. The process of claim 6 wherein, in step (e), the cooling gas is ambient air which is pulled through the foam by applying vacuum to the foam.

8. The process of claim 7 wherein, in step (c), the layered composition of foam, adhesive, and fabric is compressed between a pair of complementary dies, the first die pressing against the fabric and the second die pressing against the opposite side of the foam.

9. The process of claim 8 wherein the second die also is perforated across substantially its entire contact surface and, in step (e), the vacuum is pulled through the perforations in the second die.

10. The process of claim 7 wherein, in step (b), the land area(s) of the die is/are preheated to a temperature approximately 10 to 30 Fahrenheit degrees lower than the melting point of the adhesive.

11. The process of claim 9 wherein, in step (b), the land area(s) of the die is/are preheated to a temperature approximately 10 to 30 Fahrenheit degrees lower than the melting point of the adhesive.

12. The process of claim 10 wherein, in step (d), the steam is ejected at a temperature in the range of about 500° to 750° F.

13. The process of claim 11 wherein, in step (d), the steam is ejected at a temperature in the range of about 500° to 750° F.

14. The process of claim 12 wherein, in step (e), the vacuum is pulled through the perforations in the die.

15. The process of claim 7 wherein, in step (a), the foam piece is in the shape of a pad, and it is placed over a contoured base composed of open cell cushion foam, with a layer of hot melt adhesive in between the pad and the base; in step (d) the steam is ejected for a long enough time to reach and melt the adhesive between the pad and the base; and in step (e) the cooling gas is passed through the foam for a long enough time to also resolidify the adhesive between the pad and the base, thereby cementing the pad to the base at the same time that the fabric is laminated to the pad and the indentations are permanently fixed in the pad.

16. The process of claim 15 wherein the contoured base has a hardness of about 40 to 50 ILD and the foam pad has a hardness at least about 20 percent lower than that of hhe base.

17. The process of claim 16 wherein the base is composed of a polyurethane, polyolefin, polyether, or polyester resin.

18. The process of claim 14 wherein the adhesive is a polyamide melting somewhere in the range of about 220° to 240° F.

19. The process of claim 17 wherein the adhesive used between the fabric and the pad is polyamide melting somewhere in the range of about 220° to 240° F. and the adhesive used between the pad and the base is a polyamide melting somewhere in the range of about 200° to 220° F.

20. The process of claim 18 wherein the foam pad is composed of a polyether resin.

21. The process of claim 19 wherein the pad and base are each composed of a polyether resin.

* * * * *

UNITED STATES PATENT AND TRADEMARK OFFICE
CERTIFICATE OF CORRECTION

PATENT NO. : 4,795,517
DATED : January 3, 1989
INVENTOR(S) : George M. Elliott and Michael L. Avery It is certified that error appears in the above-identified patent and that said Letters Patent is hereby corrected as shown below:

Column 1, line 27, after "have" is inserted the word --a--;

Column 1, line 58, after "area(s)" a comma is inserted in place of the period;

Column 2, line 61, "polyether" is corrected to read --polyester--;

Column 5, line 17, "Usuall" is corrected to read --Usually--;

Column 6, line 15, "opeaable" is corrected to read --operable--;

Column 8, lines 10-11, "communicate" is corrected to read --communicates--;

Column 8, line 27, "wtth" is corrected to read --with--;

Column 8, line 36, "rddes" is corrected to read --rides-;

Column 8, line 62, "stablity" is corrected to read --stability--;

Column 9, line 49, "iine" is corrected to read --line--;

Column 10, line 10, "vessel 71" is corrected to read --vessel 165--;

UNITED STATES PATENT AND TRADEMARK OFFICE
CERTIFICATE OF CORRECTION

PATENT NO. : 4,795,517
DATED : January 3, 1989
INVENTOR(S) : George M. Elliott and Michael L. Avery It is certified that error appears in the above-identified patent and that said Letters Patent is hereby corrected as shown below:

Column 10, line 44, "value" is corrected to read --valve--;

Column 10, line 64, "nnd" is corrected to read --and--;

Column 11, line 43, "cloeed" is corrected to read --closed--;

Column 11, line 54, "valve" is corrected to read "value";

Column 11, line 59, "400° F." is corrected to read --500° F.--;

Column 11, line 61, "stea" is corrected to read --steam--;

UNITED STATES PATENT AND TRADEMARK OFFICE
CERTIFICATE OF CORRECTION

PATENT NO. : 4,795,517

DATED : January 3, 1989

INVENTOR(S) : George M. Elliott and Michael L. Avery

It is certified that error appears in the above-identified patent and that said Letters Patent is hereby corrected as shown below:

Column 12, line 22, "400° F." is corrected to read --500° F.--;

Column 12, line 35, "value" is corrected to read --valve--; and

Column 16, line 2, "hhe" is corrected to read --the--.

Signed and Sealed this

Nineteenth Day of September, 1989

Attest:

DONALD J. QUIGG

Attesting Officer

Commissioner of Patents and Trademarks